No. 679,948. Patented Aug. 6, 1901.
T. COLLINS & E. L. HARTMANN.
CENTRIFUGAL CREAM SEPARATOR.
(Application filed Dec. 21, 1900.)

(No Model.) 3 Sheets—Sheet 1.

WITNESSES:

INVENTORS
Thomas Collins
Ernest Louis Hartmann
BY
Kenyon & Kenyon
ATTORNEYS.

No. 679,948. Patented Aug. 6, 1901.
T. COLLINS & E. L. HARTMANN.
CENTRIFUGAL CREAM SEPARATOR.
(Application filed Dec. 21, 1900.)
(No Model.) 3 Sheets—Sheet 2.
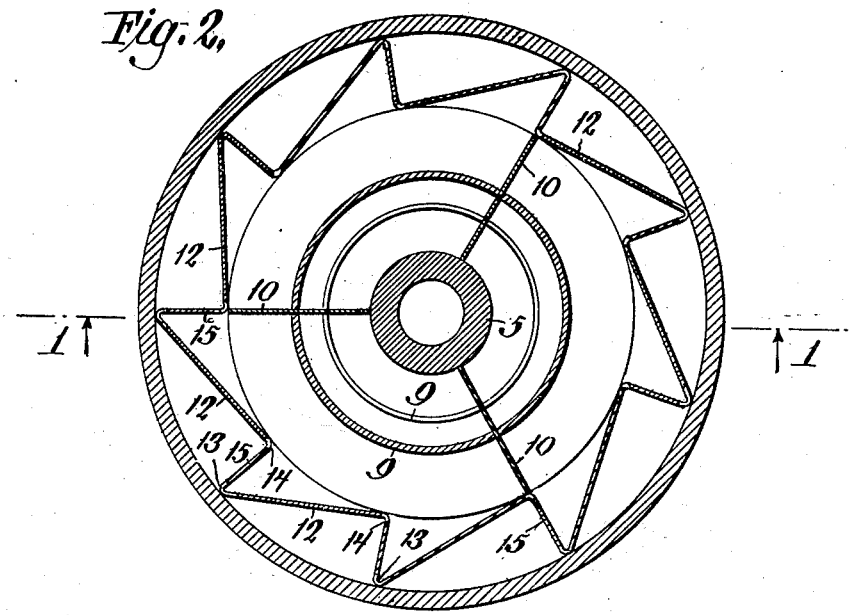
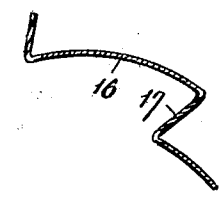
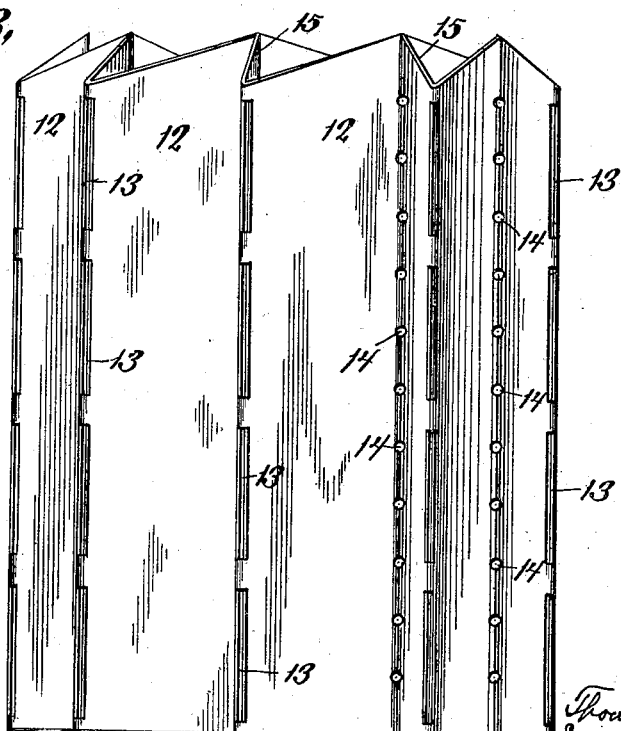
WITNESSES:
INVENTORS
Thomas Collins
Ernest Louis Hartmann
BY
Kenyon Kenyon
ATTORNEYS No. 679,948. Patented Aug. 6, 1901.
T. COLLINS & E. L. HARTMANN.
CENTRIFUGAL CREAM SEPARATOR.
(Application filed Dec. 21, 1900.)

(No Model.) 3 Sheets—Sheet 3.

WITNESSES:

INVENTORS
Thomas Collins,
Ernest Louis Hartmann,
BY
Kenyon & Kenyon
ATTORNEYS

UNITED STATES PATENT OFFICE.

THOMAS COLLINS AND ERNEST LOUIS HARTMANN, OF BAINBRIDGE, NEW YORK, ASSIGNORS TO THE AMERICAN SEPARATOR COMPANY, OF NEW YORK.

CENTRIFUGAL CREAM-SEPARATOR.

SPECIFICATION forming part of Letters Patent No. 679,948, dated August 6, 1901.

Application filed December 21, 1900. Serial No. 40,648. (No model.)

*To all whom it may concern:*

Be it known that we, THOMAS COLLINS, a subject of the Queen of Great Britain, and ERNEST LOUIS HARTMANN, a citizen of the United States, both residing at Bainbridge, county of Chenango, and State of New York, have invented certain new and useful Improvements in Centrifugal Cream-Separators, of which the following is a specification.

This invention relates to centrifugal cream-separators, and has for its object to provide a device of high efficiency and simple and convenient in its construction.

The subject-matter of the invention relates more particularly to the interior devices.

Figure 1:
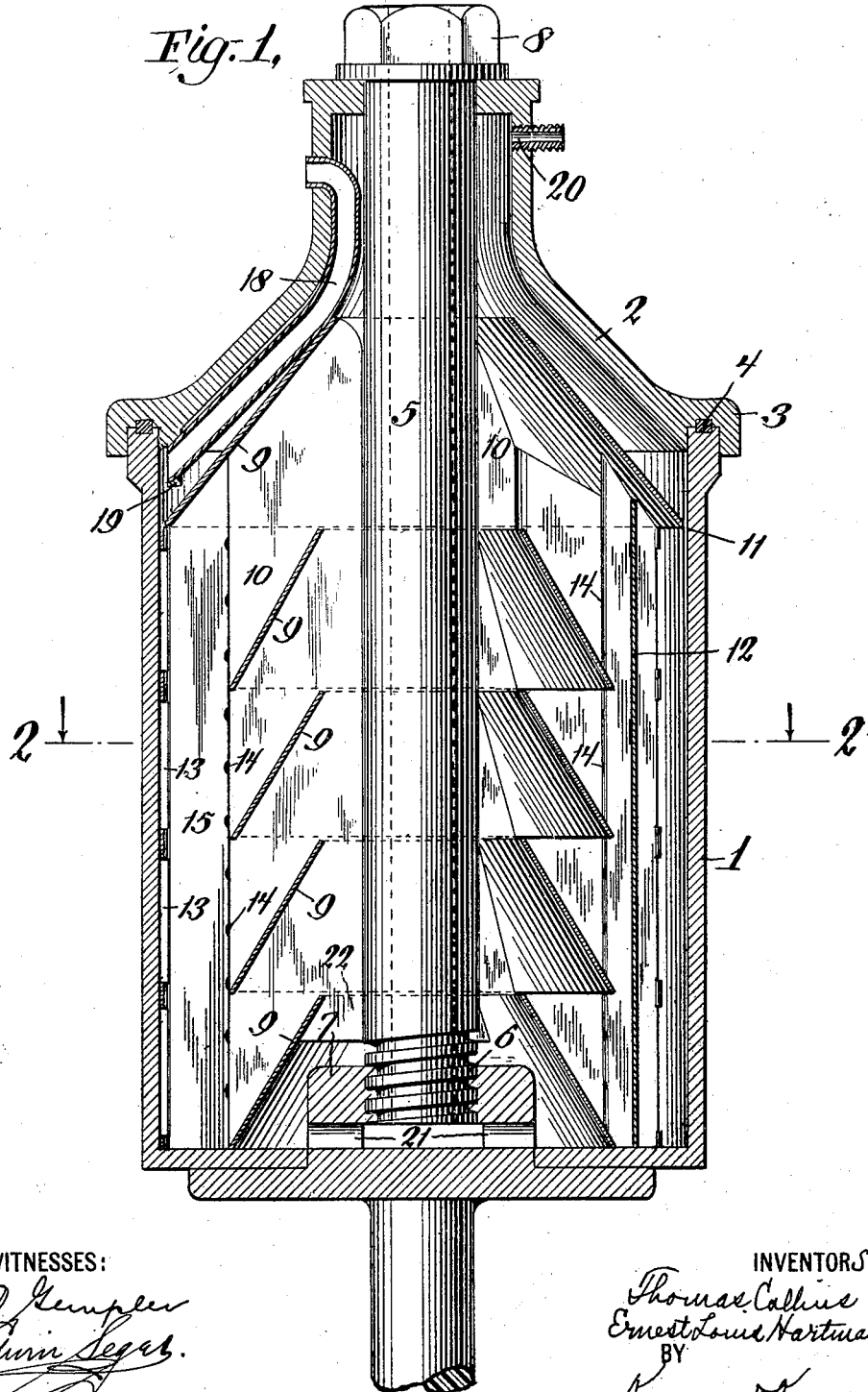
Figure 5:
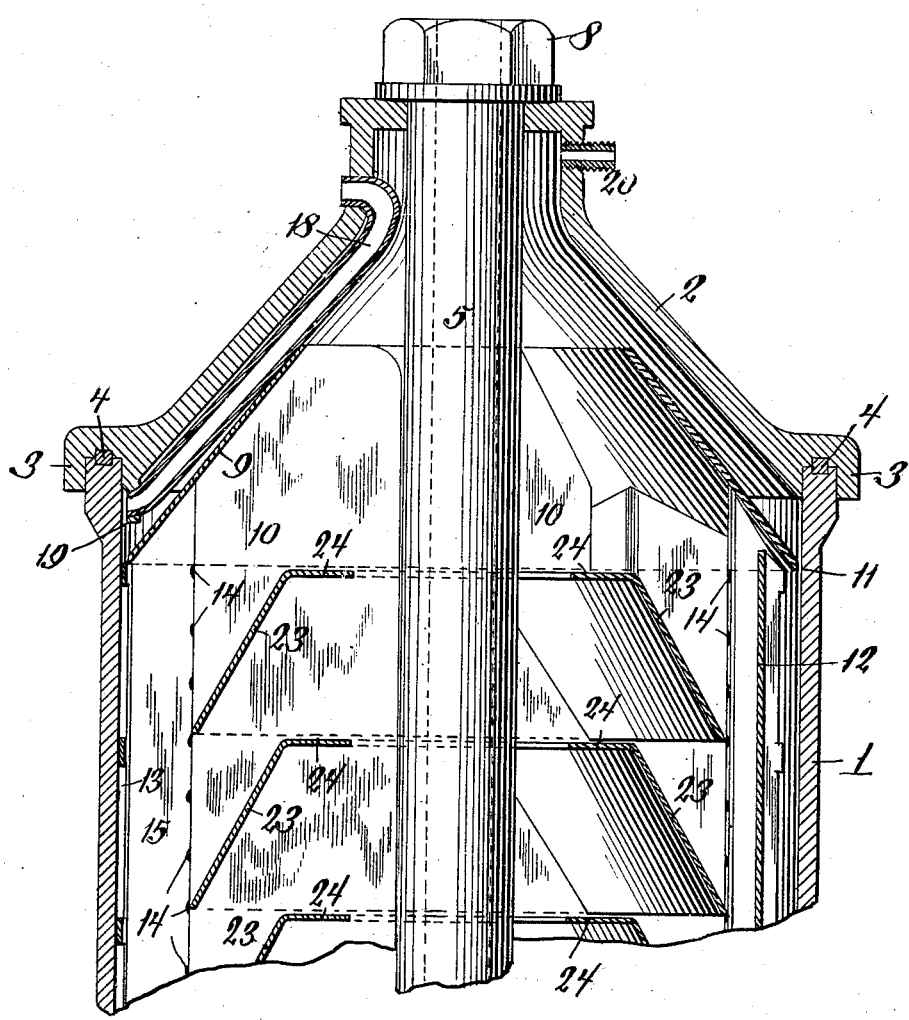

In the accompanying drawings, forming part of this application, and in which like reference-numerals designate corresponding parts, Figure 1 is a central vertical section of the bowl and interior devices of a centrifugal cream-separator embodying the invention, taken on the line 1 1 of Fig. 2. Fig. 2 is a horizontal section taken on the line 2 2 of Fig. 1. Fig. 3 is an elevation of one of the interior devices employed in the bowl. Fig. 4 is a fragmental sectional view representing a modified arrangement of the device shown in Fig. 3; and Fig. 5 is a partial central vertical section corresponding to Fig. 1, but showing a modified arrangement of one of the interior devices.

Referring now to the particular embodiment of the invention as shown in the drawings, the bowl 1, which may be of usual or convenient construction, has a top 2, which is provided with a flange 3, arranged to fit over the top of the bowl. The flange 3 has a recess in its under side, in which is seated a rubber washer 4. The top 2 does not screw onto the bowl, but rests on the top of the bowl and is clamped thereon by means of the central supply-tube 5, which, passing through the top 2, has threads 6, which screw into the block 7 on the bottom of the bowl. The nut 8 on the top of the tube 5 forms a head by means of which the tube is enabled to perform its clamping function. The top is readily removed by simply unscrewing the tube 5 from the block 7. Within the bowl and across the radial lines thereof is arranged a series of inclined partitions 9, which in the present embodiment of the invention are shown in the form of conical rings surrounding the axis of the bowl. These conical rings 9 are connected together and held in position by suitable means. These means preferably consist of several vertical radial plates 10, of which there are three shown in the drawings. These vertical plates 10 and the conical rings 9 are preferably connected together so as to form a rigid frame, so that the several parts may be removed and inserted in position at one and the same time, and whereby the balance of the bowl is more readily attained and preserved. In connecting the plates 10 and rings 9 we usually form slits in the plates 10, extending from the outer edges of the plates inward, and insert the rings 9 in these slits, the parts then being soldered together at their places of contact. The inner edges of the plates 10 fit nicely against the tube 5, as shown in Fig. 2, and hold this interior device securely but removably in position. These rings 9 are generally made in a conical form— that is, like the form of a truncated cone—and they are preferably so superposed or spaced one above another that each is wholly above or wholly below the others—that is, the rings do not overlap each other. This arrangement is clearly shown in Fig. 1 of the drawings. The upper ring 9 is preferably made so as to extend farther out toward the periphery of the bowl than the other rings 9, this upper ring leaving only a narrow passage 11 for the upward flow of the blue milk.

Between the inner periphery of the bowl and the rings 9—that is, in the outer liquid-space of the bowl—is arranged a vertical partition having a plurality of sections 12 and 15, of which the sections 12 preferably extend obliquely across the radial lines of the bowl, while the sections 15 are arranged in radial planes. These sections 12 preferably rest against the periphery of the bowl at their outer edges, and, as shown, they are held in place at their inner edges by the radial sections 15 of the partition. The sections 12 are preferably flat, as shown in Figs. 2 and 3; but in some cases they may be slightly curved, as shown in Fig. 4, in which figure the oblique sections are numbered 16 and the radial sections 17. In the best form of this outer device the sections 12 and 15 are united rigidly together and so as to form a unitary structure which surrounds the axis of the bowl, as clearly shown in the drawings. Openings 13 and 14 are provided between the sections and their outer and inner edges, respectively. We find it convenient to form the top of each of the sections 12 and 15 on a slant, so that they may fit snugly underneath the upper ring 9, as clearly shown in Fig. 1. This arrangement enables the upper ring 9 to hold the vertical partition firmly in position. The frame of which the rings 9 form a part is held down in place by means of the blue-milk ducts 18, which are carried by the top 2 and which when the top is in place on the bowl press down upon the upper ring 9 sufficiently to hold it firmly in place. There are of course the same number of blue-milk ducts 18 as there are spaces between the radial plates 10. Each of the ducts 18 is provided at its lower end with a collar 19. This collar 19 serves to protect the mouths of the ducts 18 from being bent or otherwise damaged when the top is being centered over the bowl for the purpose of securing it in place. 20 is the adjustable screw-plug for the outflow of cream.

The block 7 is provided with inlets 21 for the inflow of full milk from the feed-tube 5, and the lower ring 9 has the opening 22.

In the operation of the machine the milk enters through the tube 5, passing to the neutral zone through the openings 21 and 22 and thence rises upward. In the rotation of the bowl the plates 10 serve to impart a rotary motion to the milk, in which operation the radial stays 15 may assist more or less. The inclined partitions 9 serve to guide the cream toward the cream-wall. The oblique sections 12 of the outer vertical partition assist in the separation of the cream and operate to guide the cream toward the center of the bowl, the cream on the outer side of these sections passing inward through the openings 14 and thence upward along or between the rings 9. The blue milk on the inner side of the sections 12 is guided by these sections toward the periphery of the bowl, the openings 13 permitting the free flow of the blue milk to and around the periphery of the bowl. As the blue milk passes upward it goes through the opening 11 between the edge of the upper ring 9 and the periphery of the bowl and escapes through the duct 18. Any cream particles that may be left in the blue milk when the latter has reached the upper regions of the bowl may be guided inward by the upper ring 9 to the cream-wall.

In Fig. 5 we have shown the same construction as that shown in Figs. 1, 2, and 3, except that the inclined partitions or rings are shown in a modified form, such modified form being desirable for bowls of larger size. In this figure these rings are numbered 23, and instead of having the same constant inclination from the opening at the bottom to the opening at the top they have an upper portion 24, which extends more abruptly toward the center. This arrangement is especially desirable for the larger bowls, it being advantageous for such larger bowls to retain substantially the same inclination in the main or lower part of these inclined rings 23 as have the rings 9 in Fig. 1 and also to employ the same number of inclined rings and to have them the same distance apart without overlapping, as in the smaller bowls.

While we have herein shown our invention as embodied in the most advantageous form, it will be readily understood that various changes in construction and arrangement differing from that shown in the drawings may be made without departing from our invention.

What we claim as new, and desire to secure by Letters Patent, is—

1. In a cream-separator, the combination with a separator-bowl, of a plurality of conical rings located at the inner part of the bowl, and a vertical partition arranged between said rings and the periphery of the bowl, said partition having a plurality of vertical sections arranged obliquely to the radial line of the bowl.

2. In a cream-separator, the combination with a separator-bowl of a plurality of conical rings located at the inner part of the bowl and arranged one wholly above another, and a vertical partition arranged between said rings and the periphery of the bowl, said partition having a plurality of vertical sections arranged obliquely to the radial line of the bowl.

3. In a cream-separator the combination with a separator-bowl of a plurality of conical rings located at the inner part of the bowl, a vertical partition arranged between said rings and the periphery of the bowl, said partition having a plurality of vertical sections arranged obliquely to the radial line of the bowl, and an upper conical ring located above said vertical partition and extending nearly to the periphery of the bowl.

4. In a cream-separator the combination with a separator-bowl, of a plurality of conical rings located at the inner part of the bowl and arranged one wholly above another, a vertical partition arranged between said rings and the periphery of the bowl, said partition having a plurality of vertical sections arranged obliquely to the radial line of the bowl, and an upper conical ring located above said vertical partition and extending nearly to the periphery of the bowl.

5. In a cream-separator the combination with a separator-bowl, of a plurality of conical rings located at the inner part of the bowl, a vertical partition arranged between said rings and the periphery of the bowl, said partition having a plurality of vertical sections arranged obliquely to the radial line of the bowl, and a plurality of intermediate radial sections each connecting the outer edge of one of the oblique sections to the inner edge of the next adjacent oblique section.

6. In a cream-separator the combination with a separator-bowl of a plurality of conical rings located at the inner part of the bowl and arranged one wholly above another, a vertical partition arranged between said rings and the periphery of the bowl, said partition having a plurality of vertical sections arranged obliquely to the radial line of the bowl, and a plurality of intermediate radial sections each connecting the outer edge of one of the oblique sections to the inner edge of the next adjacent oblique section.

7. In a cream-separator the combination with a separator-bowl, of a plurality of conical rings located at the inner part of the bowl, a vertical partition arranged between said rings and the periphery of the bowl, said partition having a plurality of vertical sections arranged obliquely to the radial line of the bowl, and a plurality of intermediate radial sections each connecting the outer edge of one of the oblique sections to the inner edge of the next adjacent section, and an upper conical ring located above said vertical partition and extending nearly to the periphery of the bowl.

8. In a cream-separator the combination with a separator-bowl of a plurality of conical rings located at the inner part of the bowl and arranged one wholly above another, a vertical partition arranged between said rings and the periphery of the bowl, said partition having a plurality of vertical sections arranged obliquely to the radial line of the bowl, and a plurality of intermediate radial sections each connecting the outer edge of one of the oblique sections to the inner edge of the next adjacent oblique section, and an upper conical ring located above said vertical partition and extending nearly to the periphery of the bowl.

9. In a cream-separator the combination with a separating-bowl, of a partition having a plurality of vertical sections arranged in the liquid-space and obliquely across the radial lines of the bowl, and having openings along their inner and outer edges, and a plurality of radial sections each connecting the outer edge of one oblique section with the inner edge of the next adjacent oblique section, said oblique and radial sections forming a rigid integral zigzag partition-frame, having the outer edges of the sections resting against the inner periphery of the bowl, a plurality of conical rings arranged between the axis of the bowl and said zigzag frame, a plurality of upright radial plates, said upright plates and said conical rings intersecting each other, and an upper conical ring arranged above said zigzag partition and extending to near the periphery of the bowl.

10. In a cream-separator the combination with a separating-bowl, of a partition having a plurality of sections arranged in the liquid-space and obliquely across the radial lines of the bowl, and having openings along their inner and outer edges, and a plurality of radial sections each connecting the outer edge of one oblique section with the inner edge of the next adjacent oblique section, substantially as described.

11. In a cream-separator the combination with a separating-bowl, of a partition having a plurality of sections arranged in the liquid-space and obliquely across the radial lines of the bowl, and having openings along their inner and outer edges, and a plurality of radial sections each connecting the outer edge of one oblique section with the inner edge of the next adjacent oblique section, said oblique and radial sections forming a rigid integral zigzag partition-frame, substantially as described.

12. In a cream-separator the combination with a separating-bowl, of a partition having a plurality of sections arranged in the liquid-space and obliquely across the radial lines of the bowl, and having openings along their inner and outer edges, a plurality of radial sections each connecting the outer edge of one oblique section with the inner edge of the next adjacent oblique section, said oblique and radial sections forming a rigid integral zigzag partition-frame having the outer edges of the sections resting against the inner periphery of the bowl, and an upper conical ring arranged above said zigzag partition and extending to near the periphery of the bowl, substantially as described.

In testimony whereof we have signed our names to this specification in the presence of two subscribing witnesses.

THOMAS COLLINS.
ERNEST LOUIS HARTMANN.

Witnesses:
EDSON C. BURDICK,
SEBERT B. HOLLENBECK.